United States Patent

Miller

[15] 3,663,842
[45] May 16, 1972

[54] ELASTOMERIC GRADED ACOUSTIC IMPEDANCE COUPLING DEVICE

[72] Inventor: Darrow L. Miller, Los Angeles, Calif.
[73] Assignee: North American Rockwell Corporation
[22] Filed: Sept. 14, 1970
[21] Appl. No.: 72,057

[52] U.S. Cl. ............................310/8.3, 73/67.5 R, 73/67.8, 73/67.9, 310/8.7, 310/9.1, 333/30 R, 340/8 MM, 340/8 L, 340/8 FT
[51] Int. Cl. .......................................................H01v 7/00
[58] Field of Search..............310/8, 8.2, 8.3; 340/8 L, 8 MM, 340/8 FT; 73/67 R, 67.5 R, 67.6, 67.8, 67.7, 67.9; 333/30 R

[56] References Cited

UNITED STATES PATENTS

| | | | |
|---|---|---|---|
| 3,409,869 | 11/1968 | McCool et al. | 340/9 |
| 3,376,438 | 4/1968 | Colbert | 310/8.2 |
| 2,811,216 | 10/1967 | Harris | 181/33 |
| 2,707,755 | 5/1955 | Hardie et al. | 310/8.2 |
| 2,881,336 | 4/1959 | Elion | 310/8.2 |
| 2,427,348 | 9/1947 | Bond et al. | 310/8.2 UX |

Primary Examiner—J. D. Miller
Assistant Examiner—Mark O. Budd
Attorney—L. Lee Humphries and Francis X. Lo Jacono, Sr.

[57] ABSTRACT

An ultrasonic probe has a solid, flexible, elastic, graded acoustical impedance coupling device having fine geometrical and naturally shaped, metal and glass component powders, with their characteristic acoustic impedance values, disposed in graded varying concentrations in solid, elastomeric silicones, polyurethane, or the like low acoustic impedance, solid elastomers, providing a shaped, composite matrix coupling or a delay line. The graded matrix of component fine shaped powder in an elastomer provides a proximate matching impedance adjacent to the interface with the flat piezoelectric transducer at one device end, and a similar matching impedance near the interface to the inspected workpiece at the other device end, with intermediate low-loss graded impedance values inbetween. When a lens is employed, an effective tapered impedance can be obtained at the interface with the test article by graduating the solid concentrations primarily at the workpiece end. The elasticity of the device provides close conformation with the inspected workpiece surface, and reduces the acoustic reflection due to surface roughness and irregularities.

7 Claims, 4 Drawing Figures

Patented May 16, 1972
3,663,842
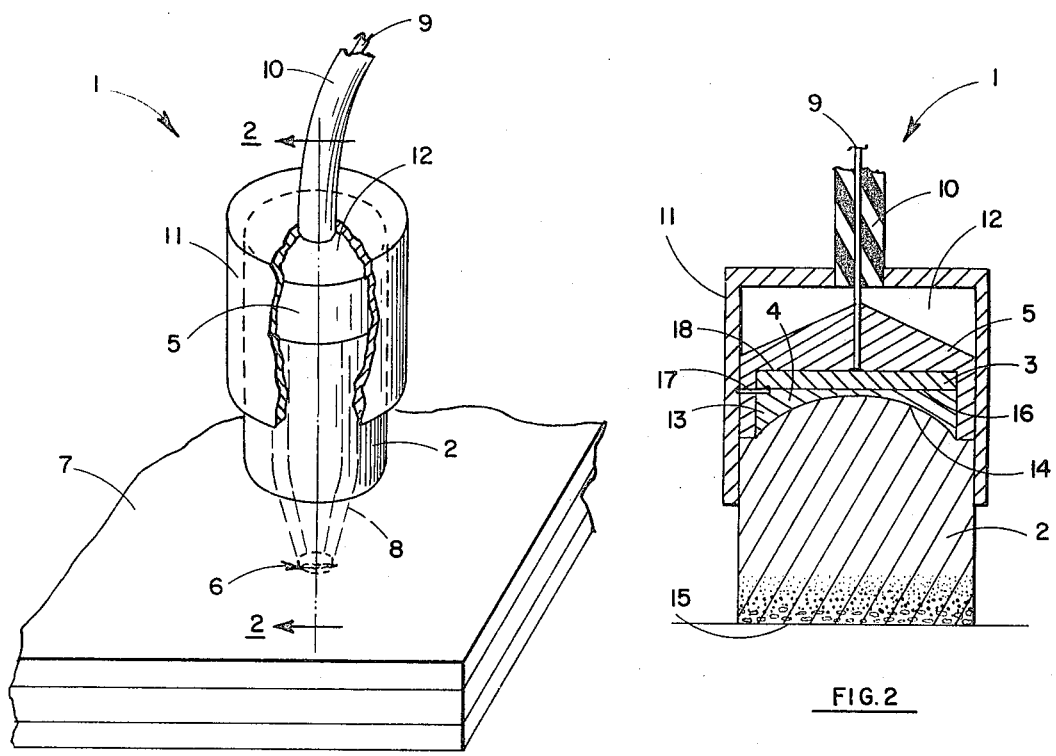
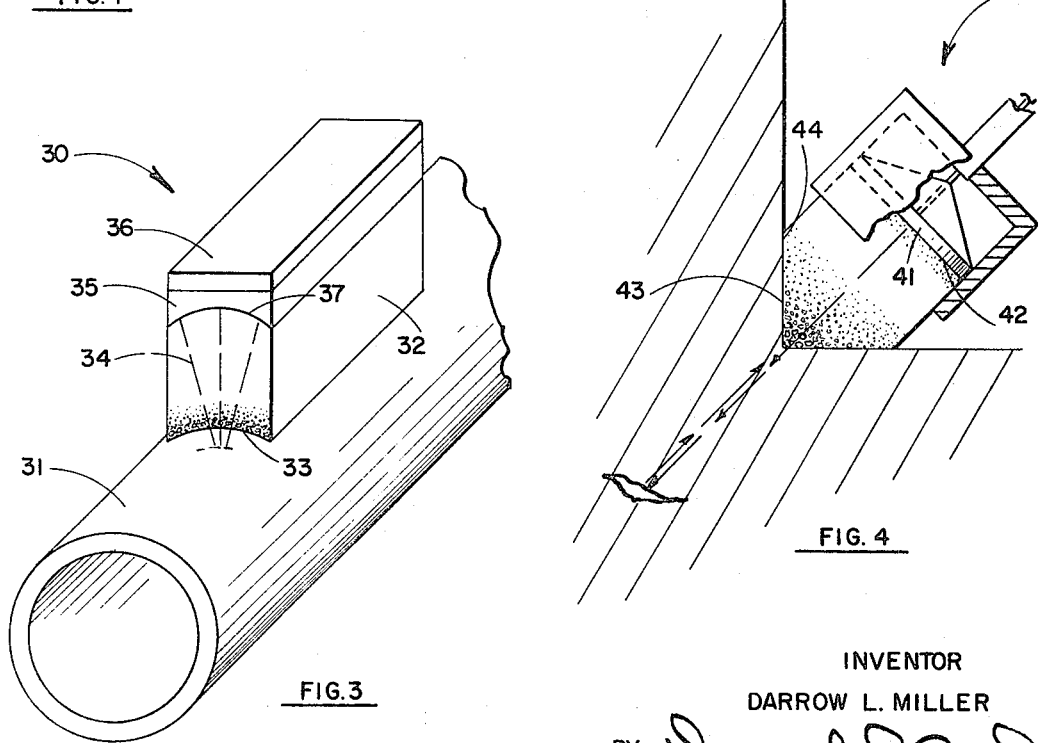
INVENTOR
DARROW L. MILLER
BY
ATTORNEY

ELASTOMERIC GRADED ACOUSTIC IMPEDANCE COUPLING DEVICE

BACKGROUND OF THE INVENTION

Acoustical transducers used for ultrasonic inspection typically have flat disc piezoelectric elements, or the elements may be slightly dished or curved as necessary to focus ultrasonic waves, as discussed in U.S. Pat. No. 2,645,727, issued July 14, 1963. Commonly a flat disc piezoelectric element is used for slightly divergent beams or a lens is secured to one face of the element, which focuses the signals originating from the element. A column of a liquid or paste couplant is conventionally disposed between the element or the focusing lens and the workpiece surface, which is being examined in the inspection process. The liquid or paste couplant replaces the air column between the piezoelectric element and the workpiece surface and proces for more efficient transmission and reflection of ultrasonic signals to and from the workpiece disposed below. Surfaces which are rough or otherwise exhibit high friction in respect to the ultrasonic probes are difficult to inspect using such a probe unless the workpiece surface and the probe are immersed in a liquid couplant. Water is frequently used due to its low cost. Often it is difficult or completely impossible to immerse the workpiece when attempting to discover delaminated areas within the structural form of an aircraft wing or other body shapes or the like. In addition, the wet couplant method is messy, costly, sometimes corrosive, often contaminates and leaves messy redicual traces. Completed components such as composite panels of the type modernly used in aircraft and space vehicles cannot be conveniently inspected after complete and permanent installation of such panels, especially in an overhead position, due to the impracticality of wetting or immersing the surfaces. Some modern supersonic aircraft have as much as 20,000 sq. ft. of steel honeycomb panels in their structure, requiring periodic inspection between flights.

The piezoelectrics used and the metals inspected by ultrasonic techniques are still mechanically; viz: they receive and deliver energy in the form of high forces and small displacements. The impedances are much higher than water or elastomer solids where smaller forces and larger displacements are involved. A good impedance (velocity × density) match between the energy source and the test part is necessary to obtain an efficient transfer of acoustical energy between the two.

In ultrasonic testing the shape and roughness of the workpiece surface is decisively important. All present testing methods make uniform surface conditions desirable for reliable flaw evaluation. It is difficult to inspect rough surfaced articles because of the interference created by scattering and by reflections due to impedance mismatch at the abrupt interface between water and the test part. A roughness of more than one-tenth acoustic wave length difference in height impairs the coupling of the acoustic waves markedly. Surface roughness considerably less than one-tenth wave length, i.e., of the order of one-tenth millimeter has little effect. Therefore, the elasticity and the graded impedance coupling of this invention can greatly decrease the scattering loss of the ultrasonic waves, as the device proximates the impedance at the interface and conforms to the surface roughness on application of pressure. The elastic graded acoustical impedance coupling device of this invention obviates the need for liquid or paste couplants used in the past during ultrasonic inspections.

SUMMARY OF THE INVENTION

An ultrasonic probe apparatus useful for nondestructively detecting internal defects in a workpiece has a flat piezoelectric element providing a slightly divergent acoustical beam. A solid, flexible, elastic graded matrix forming an acoustic delay line or coupling device is shaped and bonded to the lower normally vibrating surface of the piezoelectric element. The composite matrix has fine, geometrical or naturally shaped metal and glass component powders of graded, controlled acoustic impedance values disposed in a solid, elastomeric composition. The composite matrix has the mixture ratio values of metal and glass powders to elastomer concentrations adapted to the piezoelectric element and to the workpiece inspection surface. The first end of the composite matrix bonded to the lower surface of the piezoelectric element is adapted by the mixture ratio value of the metal and glass powders to elastomer concentration to provide a proximate acoustic impedance match adjacent to the interface with the piezoelectric element. The second, opposed matrix end is adapted by the mixture ratio value to provide a proximate acoustic impedance match at the interface to a workpiece surface which is to be inspected.

To provide a converging beam, the piezoelectric element has a focussed acoustic lens secured to the lower normally vibrating piezo-electric surface or alternatively a lens shaped piezoelectric is employed. The elastomer matrix is firmly bonded to the lower concave surface of the lens and is adapted by the mixture ratio or elastomer base to provide a suitable index of refraction with the lens material at this end of the device. The second opposed matrix end is adapted by the mixture ratio to provide a proximate acoustic impedance match at the interface with the workpiece surfaces which is to be inspected.

Typically, shaped glass beads (5–10 micron particle size), and shaped metal powders of a similar or smaller size are disposed in varying mixture ratios in an elastomer, molded to provide matching geometrical conformation to bond to the piezoelectric element face or the elastomer (with suitable index of refraction) is molded to the curved lens. The opposed end configuration is geometrically shaped for inspecting a required workpiece. The elasticity of the composite matrix adapts the coupling device to matching the configuration and roughness of the inspected workpiece surface. The metal and glass powders are selected to provide the required tapered acoustic impedance values.

BRIEF DESCRIPTION OF THE DRAWINGS

FIG. 1 is a general perspective partial sectional view of an ultrasonic probe apparatus incorporating a focussing lens and a solid, flexible, elastic, acoustical impedance coupling device of this invention as it is disposed on a workpiece suitable for inspection of the workpiece.

FIG. 2 shows a cross sectional view through 2—2 of FIG. 1 illustrating the ultrasonic probe apparatus having an acoustic lens, composite matrix, delay line coupler device.

FIG. 3 shows an isolated schematic perspective view of an ultrasonic probe apparatus including the acoustic coupling device of this invention, disposed in a configuration suitable for inspection pipe and other circular devices.

FIG. 4 shows a cross sectional view of a flat piezoelectric element with a molded geometrically loaded elastomeric coupling device for inspecting walls or in corners.

DETAILED DESCRIPTION OF THE INVENTION

Referring to FIG. 1, an ultrasonic probe apparatus 1 is shown in a partial sectional view illustrating the composite matrix delay line coupling device 2 of this invention disposed in operative relationship over a defective opening 6 embedded in a workpiece 7 which is being inspected. The focused ultrasonic beam 8 detects the defective opening 6 on operation of the apparatus 1, the pulse input signal is fed to the piezoelectric element 3 (FIG. 2) through the wire conductor 9 covered by the insulator 10 separating the wire 9 from the probe protective case 11. An air space 12 is disposed above composition 5, in case 11.

FIG. 2 illustrates the cross sectional view through 2—2 of FIG. 1, showing the ultrasonic probe apparatus 1 with the composite matrix delay line coupling device 2 completely filling one end and extending beyond the protective case 11. A first composite matrix end 13 of the coupling device 2 is prepared to provide a suitable index of refraction with the lens surface and is shown bonded at an interface 14 to acoustic focusing lens 4; and a second matrix end 15 is acoustically taper loaded at the interface with the workpiece surface and is shown freely disposed, available for confronting and conforming to a workpiece surface, as the workpiece 7 shown in FIG. 1. The lens 4 is shown secured to the piezoelectric element 3 at the interface 16. A conducting wire 17 grounds the first silver conducting face of the element 3 at interface 16 to the metal protective case 11 in a standard manner. The second face of the piezoelectric element 3 is electrically connected through its conductive face at interface 18 to the wire conductor 9. The conventional damping composition 5 is shown secured at the interface 18 to the element 3, forming a continuous annular ring around the element 3 and the focusing lens 4, serving to damp the ultrasonic signals radiating from the back side of the element 3. An air gap 12 is shown disposed in the protective case 11 behind the damping composition 5.

For deep penetration, a slightly divergent beam is employed and the convergent acoustical focusing lens 4 is omitted. In this case, the first composite matrix end 13 of the coupling device 2 is firmly bonded and acoustically matched directly to the lower flat face of the piezoelectric element 3 at the interface 16. This is illustrated in FIG. 4, where a flat piezoelectric element 41 has an impedance matched face 42 for inspecting along a wall or in a corner. The probe workpiece face 44 is geometrically loaded 43 to obviate reflections from the corner angles.

It is well known in the field of ultrasonic inspection technique that typically 80% of the ultrasonic signal input to a probe is lost through reflection at the interfaces by a poor coupling medium such as water or oil and nearly 100 percent if a gaseous interface is involved. Conventionally, water and oil compositions are used to couple a piezoelectric element 3 and water and a coupling lens 4 with a workpiece 7 or the like. The function of the couplant is to provide for as close matching of the ultrasonic impedance of the piezoelectric element 3, or the like, with the workpiece 7, or the like, as is possible, in order to decrease the reflection loss. Further, roughness of the workpiece 7, or the like, increases the scattering of the acoustic signal, impairing the beaming accuracy and increasing the risk of lateral reflections. Rough surfaces act on the ultrasonic signal like frosted glass on light, the beam becomes diffused and scattered in all directions, making position fixing more difficult. The shaped solid, flexible, elastic, composite matrix of this invention forms a tapered acoustical coupler or an acoustic delay line coupler device depending on its thickness and composition.

The matrix has fine geometrical or naturally shaped metal powders and siliceous powders of graded and controlled acoustic impedance values as required disposed in a solid, elastomeric composition. The matrix has the mixture ratio values of metal and siliceous powder as required adapted in acoustic impedance values and in their relative concentrations within the matrix to provide a desired acoustic impedance value at each interface of the composite matrix. Included in this invention is the graded impedance values of the matrix 2, having one impedance value disposed at the first matrix end 13 graded to a second acoustic impedance value at the second matrix end 15. In addition, the composite matrix 2 can have a fixed constant acoustic impedance value throughout the shaped solid structure. Referring to Table I in detail, there are listed typical acoustic impedance parameters Z along with the longitudinal acoustic velocity $V_L$ and the powder density, plus the ultrasonic signal wave length at 1 MHz. The metal powders which are typically useful in this invention can range from aluminum with an acoustic impedance Z of $1.72 \times 10^6$, to tungsten with an impedance Z of $9.98 \times 10^6$ g./cm.$^2$-sec. Other metal powders can be used as are necessary for the careful matching of the impedance value. The siliceous powders also listed in Table I range from impedance values Z of $1.23 \times 10^6$ for fused quartz to $1.52 \times 10^6$ g./cm.$^2$-sec. for natural quartz.

Other ceramic and glass powders may likewise be used as a matrix component.

Table I also lists some of the acoustic properties of a silicone rubber and a typical soft rubber. The acoustic impedance Z of a silicone rubber being $0.24 \times 10^6$ and soft rubber ranges from $0.19-0.31 \times \Phi^{106}$ g./cm.$^2$-sec.

The composite matrix 2 can be prepared by conventional methods. The required weights and volumes of components, including selected metal and siliceous powders and a liquid elastomer precursor such as a fluid, stirrable silicone rubber precursor or fluid stirrable polyurethane rubber composition precursor are mixed in the required mixture ratio value of selected metal and glass powder to elastomer precursor concentration. After thorough mixing of powder and fluid, a specific composite matrix is cured as required by the chemical nature of the elastomer precursor to produce a shaped elastic solid in accordance with well known procedure required for the specific elastomeric chemical composition. It is important that all air bubbles be removed from the fluid mix of elastomeric precursor which is combined with the powdered components, prior to the curing procedure required for the specific elastomeric composition. The precursor of composite matrix 2, or the like, may be poured directly into a protective cap 11 or the like, to form a matrix in situ. Likewise, the composite matrix of the type of 2 of this invention, may be formed as a free standing, shaped solid which can be processed at a later stage for affixing in an ultrasonic probe as required.

When a composite matrix of the type of 2 or the like is required to have graded acoustic impedance values from a first matrix end 13 to a second matrix end 14, or the like, separate fluid precursor composite matrix compositions containing the required mixture ratio of metal and glass powders to elastomer precursor compositions can be separately prepared and evacuated at room temperature to remove air bubbles. The separate composition mixes can then be formed into a shaped composition in a mold by pouring in a matrix precursor composition corresponding to the acoustic impedance value required for the first matrix end 13, or the like, then an intermediate acoustic impedance value composition, with as many intermediate acoustic impedance value compositions as are necessary, and then finally adding the acoustic impedance precursor composition corresponding to the second matrix end 14. The elastomers are very viscous in their uncured state and the mix may also be taper graded by settling techniques after first removing the air in a vacuum chamber. These graded acoustic impedance value compositions can then be cured to a shaped solid flexible, elastic composite matrix as required by the procedure. The elastomeric composition can also be machined or shaped and bonded in an ultrasonic probe as is required.

By the process described just above, it is possible to fabricate a composite matrix 2, or the like, having an acoustic impedance matching a piezoelectric element with impedance values as typically shown in Table I, ranging from barium titanate with a value of $3.15 \times 10^6$ to lithium sulphate with a value of $1.12 \times 10^6$ g./cm.$^2$-sec. The first matrix end 13, or the like, can then have an acoustic impedance value matching the piezoelectric element 3, and the second matrix end 14, or the like, can have an acoustic impedance value corresponding to a workpiece which is to be inspected. Typical construction materials used in the aerospace field will range from aluminum through titanium to stainless steel, with acoustic impedance values ranging from $1.75 \times 10^6$ for aluminum to $5.67 \times 10^6$ g./cm.$^2$-sec. for stainless steel. By utilizing a suitable metal powder, if necessary with a siliceous powder, it is possible to fabricate a composite matrix 2, or the like, which has an acoustic impedance match at the second matrix end 14, or the like, which is close to the value for the selected construction material.

The elastomeric precursor which is used in this invention is typically a low loss (minimum acoustical attenuation) fluid silicone or a polyurethane elastic precursor, or polyvinyl chloride plastisol which can be mixed in the correct mixture ratio with the desired metal and siliceous powders as required, and then cured by the required procedure for each elastomer to convert the fluid composition to a solid elastic, flexible matrix. Any low-loss elastomeric precursor which can be converted to a flexible elastic solid without removal of solvent and the like, can be utilized. The elastomer precursor should be free from interfering pigments, or the like. The elastomeric compositions, after curing to a rubber like consistency, have standard (ASTM) elongations ranging from 100 to 1,000 percent; and (ASTM) tensile strengths ranging from 500 to 3,000 psi.

A silicone elastomer precursor (Sylgard 63–489) was separately mixed with 5–10-micron-diameter glass beads, and then in a separate batch the elastomer precursor was mixed with tungsten powder. The silicone elastomer-glass bead composite matrix after curing had a density of 1.36 gs./cm.$^3$ and an acoustic impedance of 0.38×10$^6$ g./cm.$^2$-sec. The cured silicone elastomer tungsten composite matrix had a density of 2.44 g./cm.$^3$ and an acoustic impedance of 0.77×10$^6$ g./cm.$^2$-sec.

A polyurethane was separately formed into an AVERAGE volume percent matrix precursor mix with approximately 5 percent tungsten powder and in a separate mix with an AVERAGE volume of 10 percent 5–10-micron-diameter glass beads. After curing the polyurethane precursors to elastomers, in the prescribed manner to form shaped solid flexible, and GRADED elastic composite matrices, each composite matrix was secured to the face of a flat unfocused acoustical probe. The probes worked well from 1 to 15 MHz. The probes were used without any further acoustical coupling means with a reflectoscope at its lowest sensitivity. Both composite matrices, at this setting, were able to detect a 5/64-inch-diameter defect opening, down 1-¾ inch inside a titanium (5 percent aluminum and 2.5 percent tin) test plate ($Z$=2.77 g. cm.$^2$ – Sec × 10$^6$). The piezoelectric element corresponding to element 3 was lead metaniobate ($Z$=1.71 g. cm.$^2$ – Sec × 10$^6$).

The test was repeated with greater loading. Two parts by weight of polyurethane elastomer and 1 part 5 to 10 micron siliceous powder (shaped glass) by weight were combined into an AVERAGE mixture. After removing the air, the mixture was cured in the normal manner. The 5/64-diameter-defect was again detected at test frequencies of 2.25 MHz and 5 MHz using the same test procedures and apparatus.

By using the solid, flexible, elastic composite matrix of this invention in combination with a piezoelectric element, bonded through a focusing lens, or directly in bonded contact with a face of piezoelectric element, typical reflection losses which occur in ultrasonic signals at the interfaces with the test article can be greatly reduced. The elasticity of a composite matrix enables it to be used on rough surfaces with minimum reflection losses. Further, the matrix can be shaped as shown schematically in FIG. 3 to enable a probe 30 to be constructed specifically for testing on curved workpiece surfaces of pipes or the like. The probe 30 is shown disposed on a pipe 31, having a composite matrix 32 shaped at a second matrix end 33 to match the curvature of the pipe 31. The converging ultrasonic signals 34 are directed by the linear acoustic lens 35 as the acoustic signals are transmitted by the piezoelectric element 36. The first matrix end 37 is shown curved to conform to the linear focusing lens 35.

The elasticity of the composite matrix adapts a shaped composite matrix to be particularly useful in inspection of corners, concave edges of workpieces and the like. This is illustrated in FIG. 4 with probe 40 where the particle loading is shaped 43 to minimize the wall reflections. The elasticity also adapts the composite matrix to conforming to rough surfaces, with low reflection losses. Specifically, the composite matrix may be used as an independent component in ultrasonic testing procedures or may be permanently combined with a flat piezoelectric element or with a focusing lens as a bonded delay line.

Obviously, many modifications in the elastomeric graded acoustic impedance coupling device can be made in the light of these teachings, i.e., instead of constructing a low internal loss device with minimum interface reflections of the type described in this disclosure by selecting the proper elastomer, particulate size, composition, and shape, the elastomer composite can be heavily loaded throughout and formed into a matching elastic acoustical attenuator. It is therefore understood that within the scope of the appended claims, the invention may be practiced otherwise than as specifically described.

TABLE I

Impedance Coupling Device Components

| Material | $Z = (\delta V_L)$ (g./cm.$^2$-sec) × 10$^6$ | $V_L$ (cm./s) × 10$^5$ | $\delta$ (g.)/cm.$^3$ | $\lambda$ cm. at 1 MHz |
|---|---|---|---|---|
| Metal Powders | | | | |
| Aluminum (2SO) | 1.72 | 6.35 | 2.71 | 0.635 |
| Beryllium | 2.33 | 12.80 | 1.82 | 1.28 |
| Brass (Naval) | 3.61 | 4.43 | 8.1 | 0.443 |
| Copper | 4.18 | 4.66 | 8.9 | 0.466 |
| Molybdenum | 6.35 | 6.29 | 10.09 | 0.629 |
| Tungsten | 9.98 | 5.18 | 19.25 | 0.518 |
| Siliceous Powders | | | | |
| Quartz (fused) | 1.23 | 5.57 | 2.2 | 0.557 |
| Quartz (natural) | 1.52 | 5.73 | 2.65 | 0.573 |
| Borosilicate (Pyrex) | 1.24 | 5.57 | 2.23 | 0.557 |
| Plate Glass | 1.45 | 5.77 | 2.51 | 0.577 |
| Glass, flint | 1.5 | 4.26 | 3.6 | 0.426 |
| Glass, crown | 1.4 | 5.66 | 2.5 | 0.566 |
| Porcelain | 1.3–1.4 | 5.6–6.2 | 2.4 | |
| Piezoelectric Elements | | | | |
| Barium titanate | 3.15 | | 5.50 | |
| Lead zirconate-titanate | 3.0 | | 7.6 | |
| Lead metaniobate | 1.71 | | 5.8 | |
| Quartz | 1.52 | | 2.65 | |
| Lithium Sulphate | 1.12 | | 2.05 | |
| Elastomers | | | | |
| Silicone | 0.24 | 2.4 | 1.08 | 0.24 |
| Polyurethane | 0.30 | 2.8 | 1.1 | 0.28 |
| Soft Rubber | 0.19–0.31 | 1.48 | 1.3–2.1 | |
| Buna | 0.19 | 1.8 | | 0.14 |
| Focusing Lenses and Face Plates | | | | |
| Acrylic Resins | 0.32 | 2.67 | 1.18 | 0.27 |
| Epoxy Resin | 0.35 | 2.79 | 1.10 | 0.28 |

TABLE II

Aerospace Construction Materials

| Material | $Z = (\delta V_L)$ g/cm$^2$-sec × 10$^6$ | $V_L$ (cm/s) × 10$^5$ | $\delta$ (g)/cm$^3$ | $\lambda$ cm @ 1 MHz |
|---|---|---|---|---|
| Aluminum (17ST) | 1.75 | 6.25 | 2.80 | 0.625 |
| Titanium (Ti150A) | 2.77 | 6.10 | 4.54 | 0.610 |
| Stainless Steel (302) | 4.55 | 5.661 | 8.03 | 0.566 |
| Stainless Steel (410) | 5.67 | 7.39 | 7.67 | 0.739 |
| Steel | 4.65 | 5.90 | 7.85 | |
| Water | 0.149 | 1.49 | 1.0 | 0.149 |
| Air (dried) | 0.00033 | 0.33 | 0.001 | 0.033 |

I claim:

1. A coupling system for an ultrasonic probe having a piezoelectric element thereon, said system comprising:
   an elastomeric mass operatively affixed to said piezoelectric element to transmit ultrasonic signals from said element to a workpiece through said mass:
   a powdered particulate of hard material having an acoustic impedance value from about $1.7 \times 10^6$ to about $10.0 \times 10^6$ gram/cm.$^2$-sec. dispersed in said elastomeric mass nonuniformly, the amount of said particulate being sufficient both to increase the acoustic velocity of said signals through said mass and to increase the density of said mass, the greatest concentration of said particulate being proximate a first surface of said mass farthest from said piezoelectric element.

2. The structure set forth in claim 1 above, wherein:
   said first surface of said elastomeric mass is adapted to contact a workpiece surface, and
   said concentration of said particulate is in an amount sufficient to provide an acoustic impedance in said elastomeric mass at said first surface thereof substantially equal to the acoustic impedance of said workpiece.

3. The structure set forth in claim 2 above, wherein:
   said piezoelectric element contacts a second surface of said elastomeric mass, and
   said powdered particulate is further concentrated in a portion of said elastomeric mass closest to said second surface thereof, and in an amount sufficient to produce an acoustic impedance in said elastomeric mass at said second surface substantially equal to the acoustic impedance of said piezoelectric element.

4. In an ultrasonic probe:
   a piezoelectric transducer for originating ultrasonic signals,
   a lens in contact with said transducer for focusing said signals,
   an elastomeric mass adapted at one end thereof to contact a workpiece surface and secured at its opposite end thereof to said lens for transmitting said focused signals to said workpiece surface, and
   a quantity of powdered material integrally contained and disposed within a portion of said elastomeric mass proximate said workpiece surface.

5. The structure set forth in claim 4 above, wherein:
   said quantity of powdered material is dispersed nonuniformly from a maximum concentration at a surface of said elastomeric mass adapted to contact said workpiece surface and tapering to a minimum concentration sufficient to produce a substantial change of the index of refraction between said elastomeric mass and said lens.

6. The structure set forth in claim 4 above, wherein:
   said workpiece surface is non-planar, and
   said portion of said elastomeric mass is shaped to provide a contoured surface oppositely corresponding to said non-planar workpiece surface.

7. An acoustic coupling device or delay line comprising:
   a shaped, solid, flexible, elastic, composite matrix, said matrix having fine geometrical or naturally shaped metal and siliceous powders of graded, controlled, acoustic impedance values disposed in a solid, elastomeric composition, said matrix having the mixture ratio value of metal and glass powder to elastomer concentration adapted to provide a uniform acoustic impedance match to proximate an adjacently disposed workpiece.

* * * * *